United States Patent [19]
Schmidt et al.

[11] Patent Number: 6,038,689
[45] Date of Patent: Mar. 14, 2000

[54] FAULT NOTIFICATION SYSTEM AND PROCESS USING LOCAL AREA NETWORK

[75] Inventors: Thomas J. Schmidt, Milford, N.H.; Lawrence Huppert, Sudbury, Mass.

[73] Assignee: Digital Equipment Corporation, Houston, Tex.

[21] Appl. No.: 08/915,771

[22] Filed: Aug. 21, 1997

[51] Int. Cl.[7] ............................................. G06F 11/00
[52] U.S. Cl. ................................. 714/48; 709/224
[58] Field of Search ................... 395/185.01, 184.01, 395/183.19, 183.12, 133.07, 200.53, 200.54, 200.67; 340/825.16; 714/47, 48, 26; 709/223, 224

[56] References Cited

U.S. PATENT DOCUMENTS

| | | | |
|---|---|---|---|
| 5,307,354 | 4/1994 | Cramer et al. | 371/11.2 |
| 5,388,267 | 2/1995 | Chan et al. | 395/183.12 |
| 5,432,715 | 7/1995 | Shigematsu et al. | 395/184.01 |
| 5,631,847 | 5/1997 | Kikinis | 709/207 |
| 5,689,416 | 11/1997 | Shimizu et al. | 395/200.53 |
| 5,689,726 | 11/1997 | Lin | 395/183.12 |
| 5,764,919 | 6/1998 | Hashimoto | 395/200.67 |
| 5,790,779 | 8/1998 | Ben-Natan | 714/46 |
| 5,790,780 | 8/1998 | Brichta et al. | 395/184.01 |
| 5,802,265 | 9/1998 | Bressoud et al. | 714/13 |
| 5,815,652 | 9/1998 | Ote et al. | 395/183.07 |

FOREIGN PATENT DOCUMENTS

| | | | |
|---|---|---|---|
| 0 484 261 A2 | 9/1991 | European Pat. Off. | H04L 12/24 |
| 33 33 511 A1 | 4/1985 | Germany | G07F 9/02 |

OTHER PUBLICATIONS

"Networking—NIC Vendors Facing Tough Times," *Infoworld*, vol. 19, No. 30 (Jul. 28, 1997).

*Primary Examiner*—Robert W. Beausoliel, Jr.
*Assistant Examiner*—Christopher A. Revak
*Attorney, Agent, or Firm*—Hamilton, Brook, Smith & Reynolds, P.C.

[57] ABSTRACT

A fault notification system detects the non-operational state of the computer, or other type of network device, and transmits network messages from the device to a monitoring system or control console in the case of a detected non-operational state. The network messages are constructed by the network device when it is operational, preferably by the operating system before any problem is detected. This message is then stored in some non-volatile storage medium, such as the BIOS memory in one embodiment. As a result, very limited operating system functionality must be replicated in the device BIOS. Only the actual transmitted message must be stored and the commands necessary to have the message sent. In some embodiments, an auxiliary processor is used to detect improper operation, preferably via a dedicated, secondary bus. It loads the relevant messages into the transport buffer for transmission to the monitoring system even where the computer's CPU may not be operational.

45 Claims, 5 Drawing Sheets

FAULT NOTIFICATION SYSTEM AND PROCESS USING LOCAL AREA NETWORK

BACKGROUND OF THE INVENTION

In most modern organizations, many of the employees or members have their own personal computers. These computers are typically physically distributed throughout the organization's facilities but interconnected via a computer network to enable the exchange of information. Many mid-size and large organizations will also have personnel dedicated to maintaining the network, performing tasks such as network management, installing new computers, and repairing those computers that have already been installed.

Since employee reliance on the computers is growing as their use and functionality increase, it is desirable to decrease the downtime. As a result, maintenance personnel should be dispatched to a malfunctioning computer as soon as possible.

The issue is addressed, somewhat, in newer remote-power-on systems. These systems typically have an power supply that operates on line power, in addition to the main power supply for the computer. The network interface card is at least partially powered by the auxiliary power supply when the computer is otherwise off. This partial powering allows the network interface card to receive primitive messages from the network, such as a remote-power-on command. When received, the command is typically passed to a microcontroller within the computer that activates a power-up sequence. Such a system allows the computer to be remotely powered-up and booted to perform maintenance or so that the computer is operational when the employee returns to work in the morning, for example.

In the remote-power-on systems, there is typically some mechanism for notifying a control console if a particular computer fails to properly power-up. This functionality is supported by placing a primitive operating system in the memory storing the basic input/output system (BIOS) so that the central processing unit (CPU) of the computer can construct the appropriate message and place it in the network interface card's transport buffer for transmission to the control console.

SUMMARY OF THE INVENTION

There are a number of problems with existing fault notification protocols. First, their implementation is generally limited only to machines that have the remote power-on capability. While the numbers of such machines are increasing in the marketplace, today, they still represent a small portion of the computers sold. A second problem is the fact that existing systems tend to be expensive and add a significant incremental cost to the computer's total price, since a portion of the operating system must be replicated in the BIOS memory. This increases expense in two related ways. The additional memory for the BIOS is expensive, and the thus-configured computer is nonstandard adding to the cost in an increasingly commoditized environment. Another problem with existing systems is that they only provide fault notification in a limited class of problems where the central processing unit's bus and BIOS are operating properly but boot-up fails. The systems are useless where a bus, CPU, or BIOS failure has occurred.

The present invention is directed to a fault notification system and process that solves these previously identified problems. Similar to previous fault notification systems, the present invention detects the non-operational state of the computer, or other type of network device, and transmits network messages from the device to a monitoring system or control console in the case of a detected non-operational state. It differs, however, in that the network messages are constructed by network device when it is operational, preferably before any problem is detected.

For example, the network message, e.g., packet, cell, or frame, is constructed by the network device's operating system in anticipation of a non-operational state. This message is then stored in some non-volatile storage medium, such as the BIOS memory in one embodiment. As a result, very limited operating system functionality must be replicated in the device BIOS. Only the actual transmitted message must be stored and the commands necessary to have the message sent.

In specific implementations, the network messages identify the network device to the monitoring system. Additionally, especially where the monitoring system does not have asset tracking information, it is also helpful to encode the vendor or manufacturer of the network device in the messages. The network messages also include information regarding the failure mode of the network device to possibly identify the source of the problem.

In one implementation, to further limit the necessary intelligence in the non-volatile memory, the network messages are continuously transmitted at a relatively low duty cycle, once every five minutes for example. In this way, even if the monitoring system is non-operational at the time of the fault, it will receive the message when it later becomes operational.

In another embodiment, the fault notification system comprises a non-volatile memory that is accessible by the transmission system, network interface card, for example. This transmission system is configured to automatically send the network messages a predetermined time after detecting the power-up of the network device. During typical operation, however, this automatic transmission is disabled by the operating system after a successful boot-up operation has been completed.

The second embodiment is most easily implemented by loading the network messages into a network transport buffer when power-on is first detected by the transmission system, which messages are automatically transmitted when a timing system times-out, unless disabled by the operating system.

In a third embodiment, the system includes an auxiliary processor, which can be one that also performs other housekeeping functions, such as detecting operating temperatures and power supply voltages. This processor is typically powered by an auxiliary power supply. If it detects improper operation, either during boot-up or later during normal operation, it loads the relevant messages into the transport buffer for transmission to the monitoring system even where the computer's CPU may not be operational. In this embodiment, it is not critical to pre-construct the messages, since the system has the benefit of the processing resources of the auxiliary processor.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE EMBODIMENTS

Figure 1:
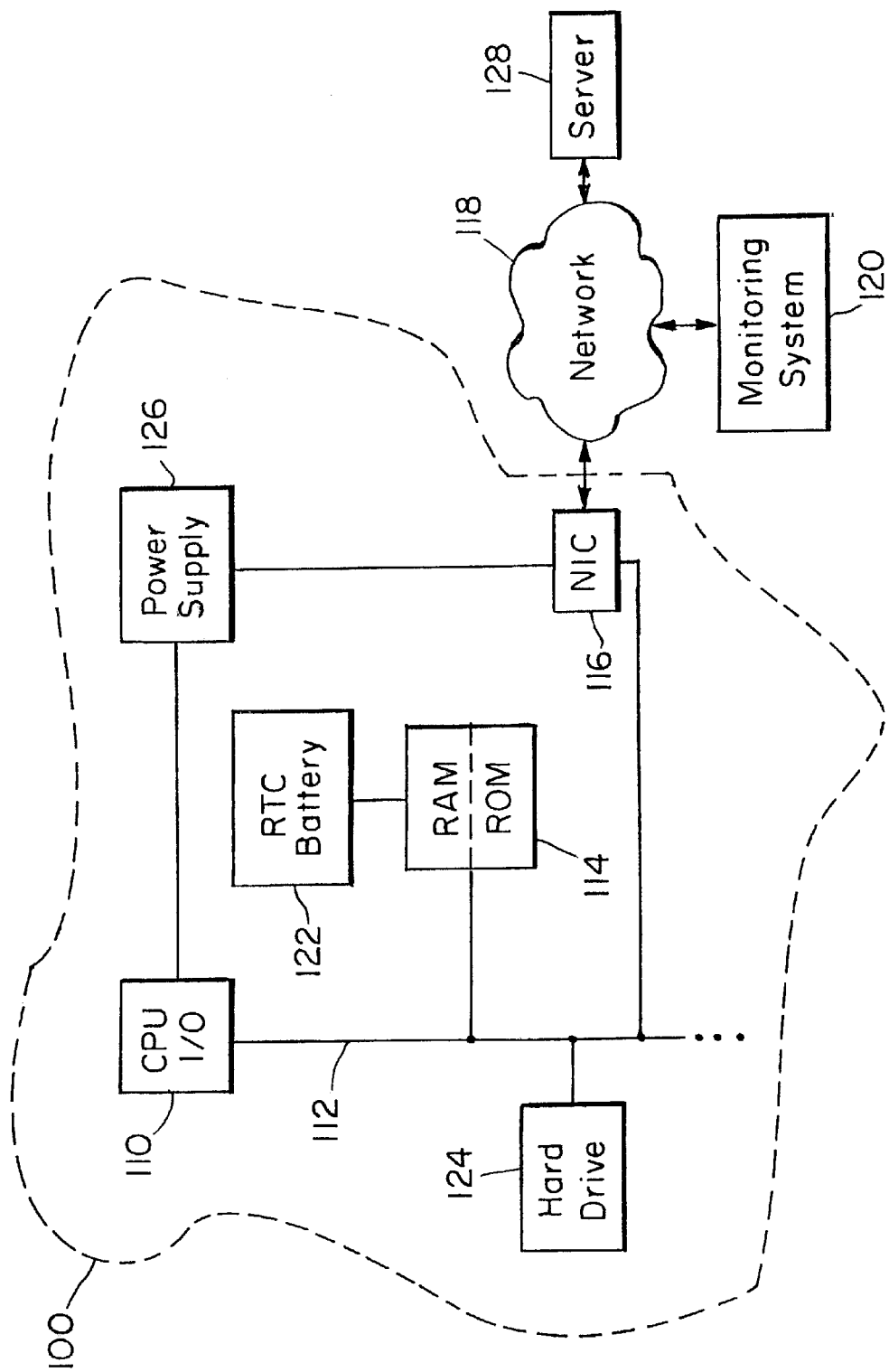
FIG. 1 is a block diagram of a fault notification system according to the present invention.

FIG. 1 is a block diagram of a computer or other network device 100 having a fault notification system according to the present invention. As is common, a CPU 110 transfers information between various peripheral devices via a bus 112 received at an input/output (I/O) port. The BIOS memory 114, accessible by this bus, holds the instructions necessary for the CPU to load an operating system from another peripheral device (e.g., hard drive 124) or from a server 128 via a network connection through a network interface card 116. The BIOS memory 114 is typically non-volatile CMOS RAM that is powered by a real time clock battery 122, or alternatively may be EEROM or flash memory. BIOS memory 114 also includes a typically much larger ROM memory.

Connected to the network 118 is a monitoring system or control console 120. In situations in which the CPU 110 fails to load the operating system from the hard drive 124 or from a server 128 via the network 118, the CPU accesses the BIOS 114 to retrieve network messages which are passed to the network interface card 116 for transmission to the monitoring system 120 according to the invention.

Figure 2:
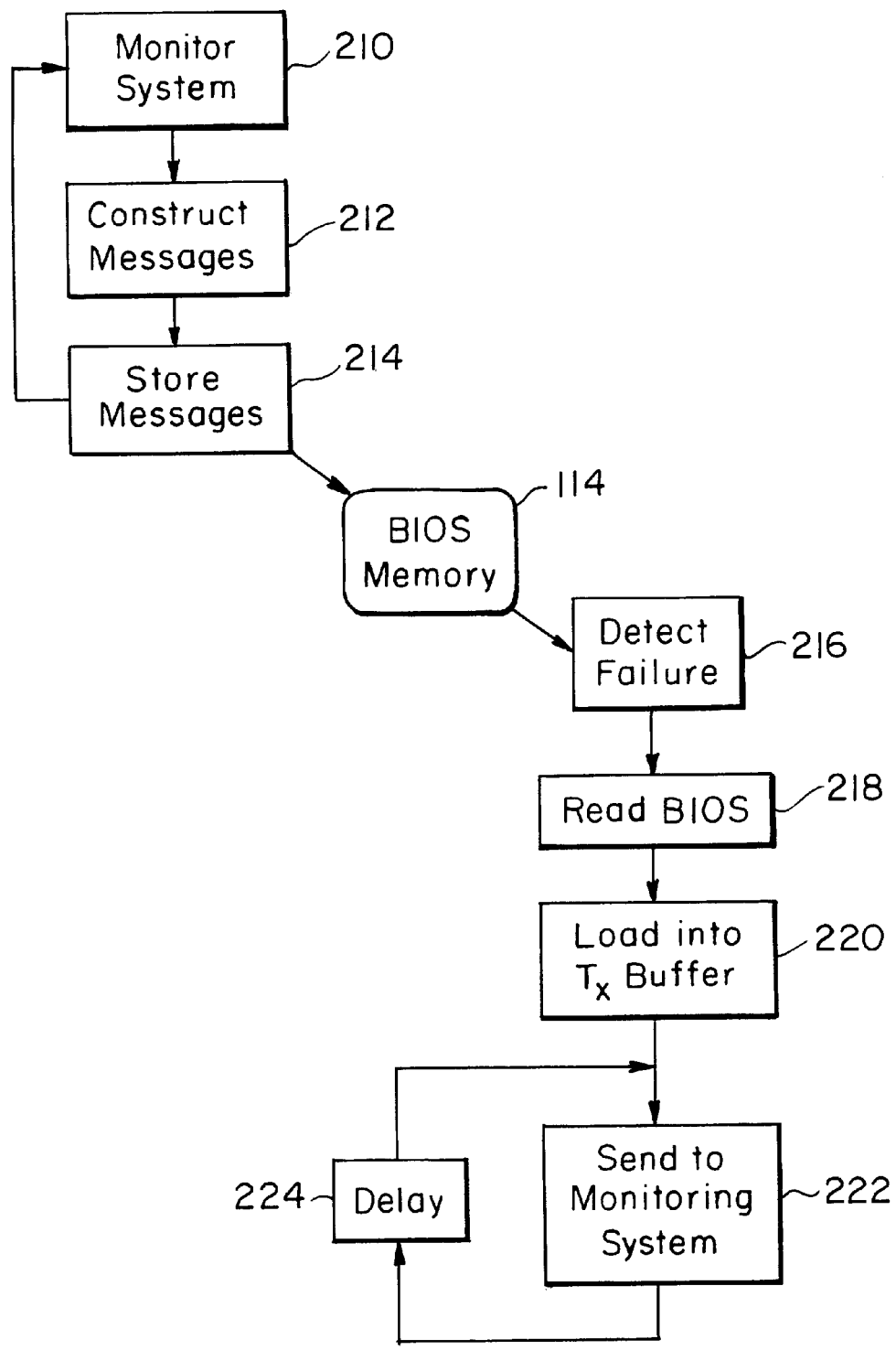
FIG. 2 shows a fault notification process according to the present invention.

FIG. 2 is a flow diagram showing the process for forming and transmitting the network messages according to the invention. At times when the computer 100 is fully operational, it monitors itself to assess its configuration and health in step 210. This functionality is typically provided as part of the operating system and includes detecting possible failure modes, dynamic random access memory size, disk write errors, and network communication errors and tracking new/deleted peripheral devices such as hard drives or auxiliary cards. This information is encoded and placed in a network message by the operating system in step 212, the message being constructed according with the protocol of the network 118. Typically the network message is a packet with the information encoded in the payload. The packet's source address corresponds to the computer 100 itself and the destination address is of the monitoring system. The constructed message is stored into the non-volatile BIOS memory 114 in step 214.

The message that is stored in the BIOS memory 114 is used when the computer 100 becomes non-operational in step 216. A primary example would be when the computer, after power-up, fails to properly boot and load the operating system. Upon detecting such failure, the BIOS ROM instructs the CPU 110 to read the network message stored in the BIOS RAM 114 in step 218. The message is written to the transport buffer $T_x$ in the network interface card 116 (step 220), which sends it to the monitoring system 120 in step 222.

Preferably, the network messages are continually resent at a low duty cycle until the computer is reset. In one example, the message is re-sent after executing a delay of several, e.g., five, minutes in step 224. Thus, if the monitoring system 120 is temporarily not available on the network 118, the message will be repeated until it is received, avoiding the BIOS having to process acknowledgment signals from the monitoring system.

Figure 3:
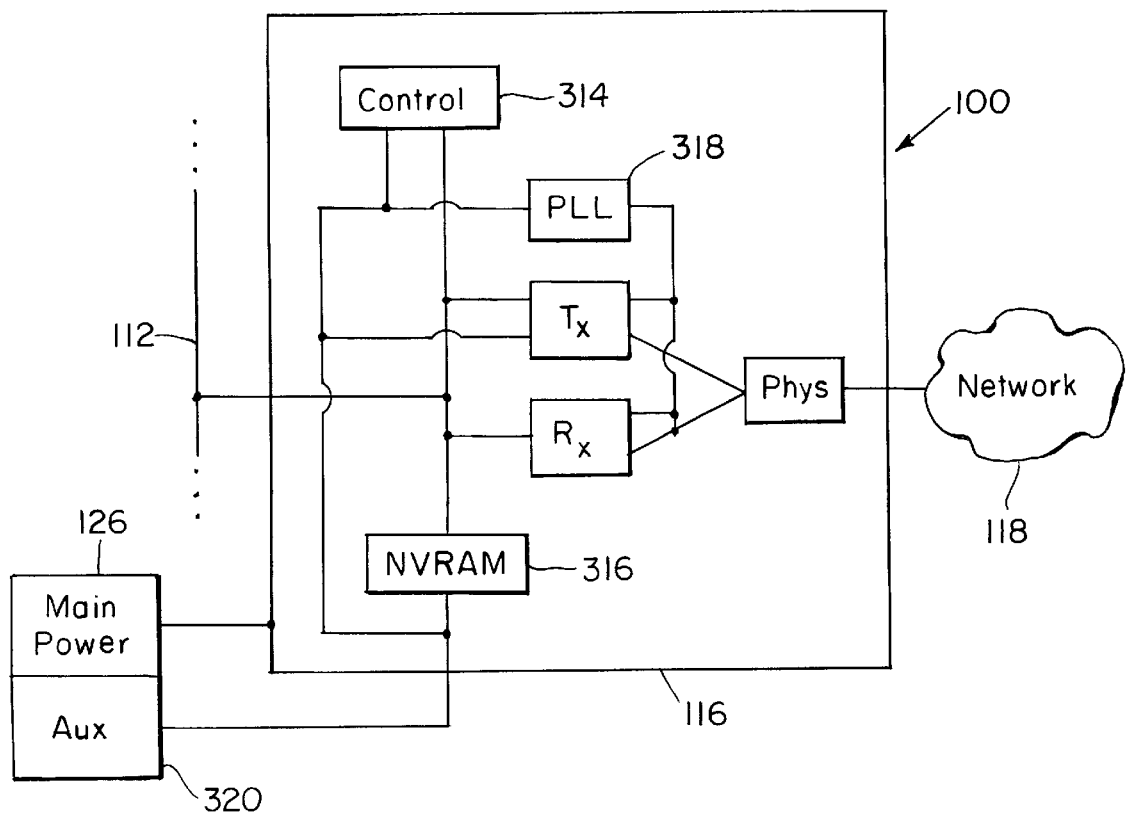
FIG. 3 is a block diagram of a second embodiment of a fault notification system of the present invention.

FIG. 3 is a second embodiment of the fault notification system that has been constructed according to the principles of the present invention.

In this embodiment, the notification system is closely integrated with the network communication system. The network messages are stored on non-volatile RAM 312 that is directly accessible by the network communication system, preferably on the network interface card 116. This non-volatile RAM 312 is accessible by a control circuit 314, also on the network interface card, which loads the messages into the transport buffer $T_x$ of the card.

Figure 4:
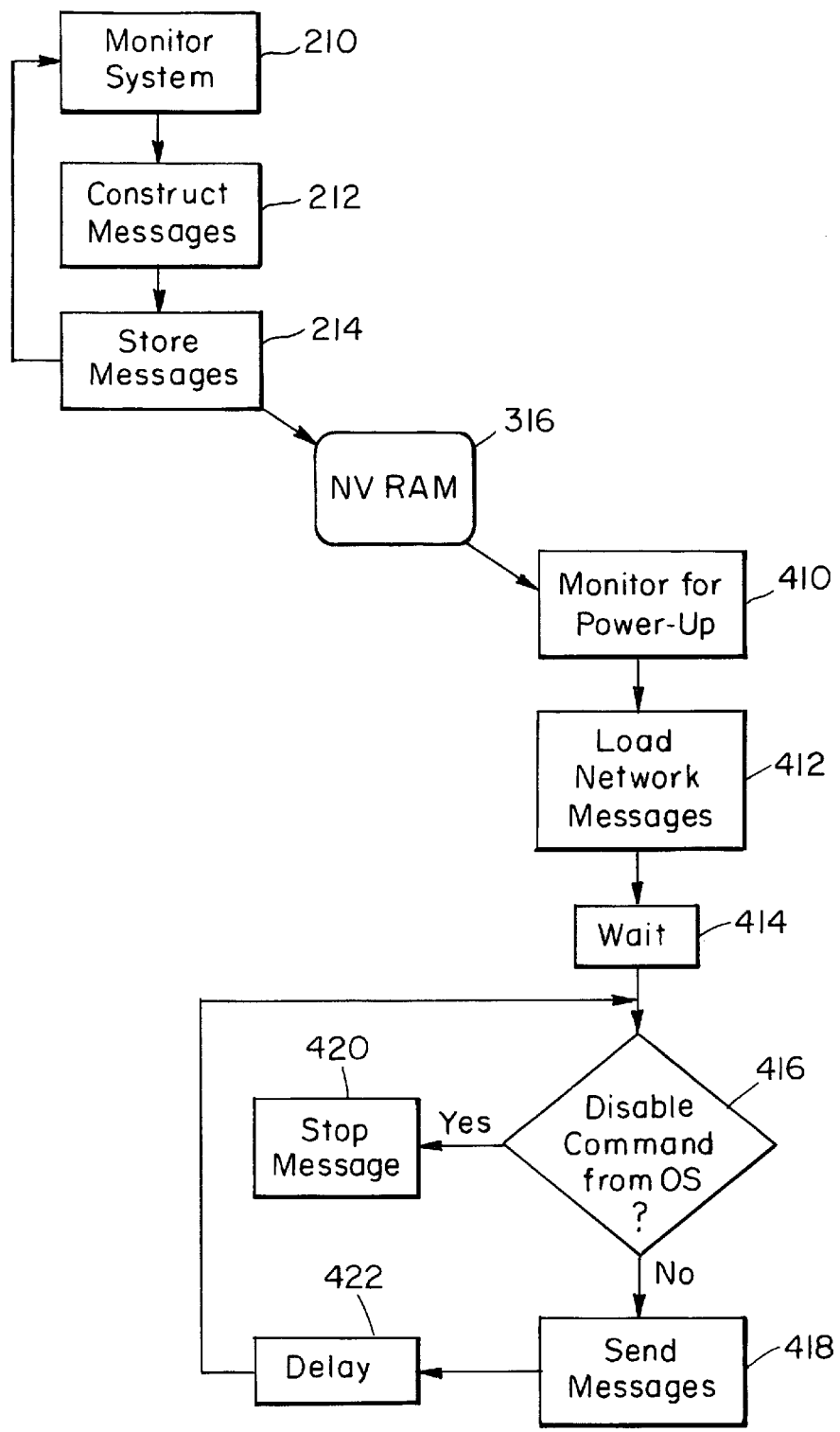
FIG. 4 shows a second embodiment of the inventive fault notification process.

FIG. 4 is a block diagram illustrating the operation of the second embodiment. Similar to the first embodiment, the monitoring system, preferably in the computer's operating system, monitors the status of the computer (step 210) and constructs network messages while the computer is operational in step 212. The messages are stored, however, in step 214 to the non-volatile RAM 316 in the network interface card 116.

The control circuit 314 of the network interface card 116 in step 410 monitors the computer 100 for power-up. When the event is detected, the control circuit loads the network message into the transport buffer $T_x$ of the network interface card 116 (step 412). The control circuit also begins a timing routine either as a software/firmware function or using a separate timing circuit in step 414. The system waits for a time corresponding to the maximum possible boot-up time for the computer, e.g., a few minutes in most devices. When the timer times out, the transport buffer $T_x$ is signaled to send the network message in step 418. Only if the device successfully boots will the timer be disabled by a command from the operating system in step 416. This prevents the transport buffer from sending the network message (step 420). In other implementations, the BIOS instructions may allow for the disabling the message transmission even where an operating system has not been successfully loaded, allowing the BIOS to send its own message. In either case, the system effectively acts as a deadman switch so that the network messages will be sent when the device fails to disable their transmission.

As in the first embodiment, the message is repeatedly sent after executing a delay in step 422. At each transmission, it may be disabled by the system, however.

Returning to FIG. 3, in one preferred implementation, the non-volatile RAM 316, transport buffer $T_x$, phase-locked loop 318, and control circuitry 314 of the network interface card 116 are powered by an auxiliary power supply 320 of the computer 100. Many newer computer systems have two power supplies. The main power supply 126 converts a.c. line current to power the system and has tens or hundreds of Watts of output capacity. An auxiliary power supply is used to convert line power but in much lower quantities continuously while the computer is connected to a line power source. This is typically used to provide power to the circuitry that controls the computer during power-up and power-down.

According to the present invention, the network interface card is at least partially powered by the auxiliary power unit 320. The transmission of the network messages is thus not subject to the proper operation of the main power supply 126. Moreover, the transmission system continually receives power and can detect the power-up situation.

Figure 5:
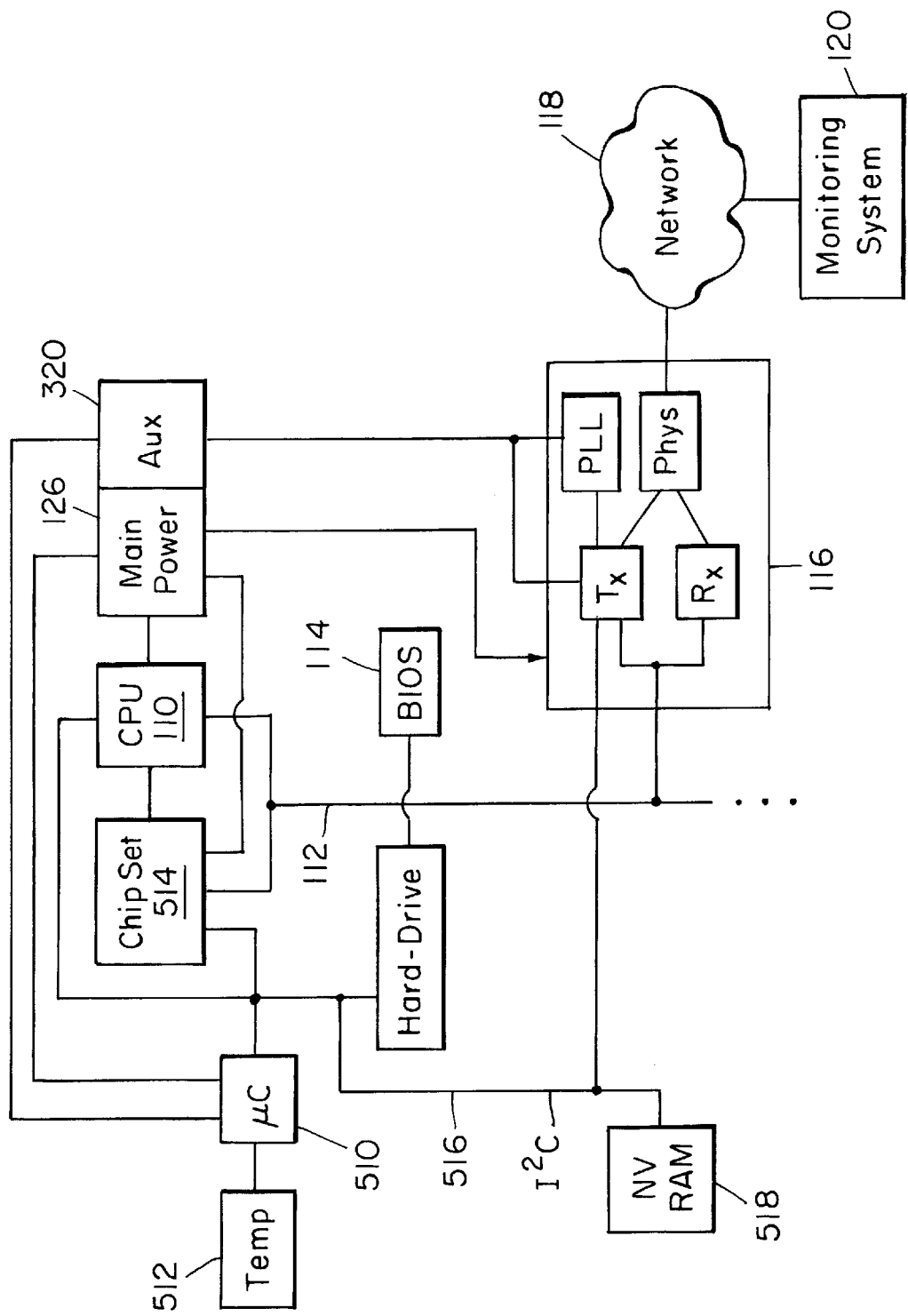
FIG. 5 is a block diagram of a third embodiment of a fault notification system of the present invention.

FIG. 5 is a block diagram of a third embodiment of the fault notification system of the present invention. This embodiment additionally has a microcontroller 510 that receives power from the auxiliary power supply 320. In many implementations, this will be the microcontroller that is used to monitor the system's health such as operating temperature 512 and voltage from the main power supply 126. This microcontroller 510 is preferably connected to communicate with the CPU 110 and its chip set 514 via a separate low-speed bus 516. One such bus is a two wire bus referred to as $I^2C$ (integrated interconnect). This provides a mechanism by which the microcontroller 510 directly monitors the CPU 110 and chip set 514 in the event where the CPU's main bus 112 is not operational. The low speed bus 516 is also in communication with the transport buffer $T_x$ of the network interface card 116. When the microcontroller 510 detects improper operation of the central processing unit, for example, during boot-up, the microcontroller loads the network message into the transport buffer $T_x$ for transmission to the monitoring system 120.

The third embodiment is capable of monitoring a broader array of the problems in the computer system. Since the microcontroller 510 operates off the auxiliary power supply 320, it can also detect problems with the main power supply 126. Moreover, it can be used to identify specific faults in the chip set 514, CPU 110, or other peripheral devices via its low speed bus 516. Thus, it can detect and notify if the CPU fails a self-test sequence at power-up, for example.

In one implementation, the third embodiment stores the network message in non-volatile RAM 518 assessable by the microcontroller 510. However, since it has the benefit of the processing power of the microcontroller 510, this embodiment does not need to fully construct the network fault messages while the system is operating normally. Instead, it can process raw information acquired by the microcontroller 510 during a fault and construct the network message for transmission to the monitoring system 120.

While this invention has been particularly shown and described with references to preferred embodiments thereof, it will be understood by those skilled in the art that various changes in form and detail may be made therein without departing from the spirit and scope of the invention as defined by the appended claims.

We claim:

1. A fault notification process for a network device connected to a monitoring system via a computer network, the notification process comprising:
    constructing a network message prior to detection of a non-operational state of the network device, the network message signaling the non-operational state of the network device;
    storing the network message;
    detecting the non-operational state of the network device; and
    transmitting the network message to the monitoring system in response to the non-operational state of the network device.

2. The notification process described in claim 1, wherein constructing the network message comprises including in the message an identification of the network device.

3. The notification process described in claim 1, wherein constructing the network message comprises including in the message a vendor code of the network device.

4. The notification process described in claim 1, wherein constructing the network message comprises including in the message a failure mode of the network device.

5. The notification process described in claim 1, wherein the network device is a client computer.

6. The notification process described in claim 1, wherein the network device is a network communications device.

7. The notification process described in claim 1, further comprising continuously transmitting the network message until reset.

8. The notification process described in claim 7, further comprising transmitting the network message with a duty cycle of several minutes.

9. The notification process described in claim 1, further comprising storing the network message in basic input/output system memory.

10. The notification process described in claim 9, further comprising the basic input/output system instructing a central processor to load the network message into a transmission system for transport to the monitoring system when an operating system fails to properly boot.

11. The notification process described in claim 1, further comprising forming the network message with an auxiliary processor that loads the network message into a transmission system of the network device.

12. A fault notification process as in claim 1 wherein the network message is constructed based on a computer network protocol.

13. A fault notification process for a network device connected to a monitoring system via a computer network, the notification process comprising:
    constructing a network message, when the network device is operational, signaling a non-operational state of the network device;
    storing the network message;
    detecting and providing notification of the non-operational state of the network device by sending the network message a predetermined time after detecting power-up of the network device unless instructed otherwise by an operating system and/or basic input/output system.

14. The notification process described in claim 13, further comprising forming a new network message and sending the new message in response to a central processing unit detecting failures during a self-test sequence.

15. A fault notification process for a network device connected to a monitoring system via a computer network, the notification process comprising:
    constructing a network message, with an auxiliary processor when the network device is operational, the message signaling a non-operational state of the network device;
    storing the network message;
    detecting the non-operational state of the network device;
    the auxiliary processor transmitting the network message to a transmission system via a low speed bus; and
    the transmission system transmitting the network message to the monitoring system.

16. The notification process described in claim 15, further comprising the auxiliary processor sending the network message a predetermined time after detecting power-up of the network device unless instructed otherwise by an operating system.

17. A fault notification system for a network device, comprising:
   an operating system executing on a central processor of the network device that constructs a network message prior to detection of a non-operational state of the operating system, the network message signaling the non-operational state of the operating system;
   a non-volatile memory that holds the network message; and
   a transmission system that sends the network message to a monitoring system in response to the non-operational state of the operating system.

18. The fault notification system described in claim 17, wherein the message identifies the network device.

19. The fault notification system described in claim 17, wherein the message identifies a vendor of the network device.

20. The fault notification system described in claim 17, wherein the message identifies a failure mode of the network device.

21. The fault notification system described in claim 17, wherein the network device is a client computer.

22. The fault notification system described in claim 17, wherein the network device is a network communications device.

23. The fault notification system described in claim 17, wherein the transmission system continuously transmits the network message until reset.

24. The fault notification system described in claim 23, wherein a duty cycle of transmissions of the network message is several minutes.

25. The fault notification system described in claim 17, wherein the non-volatile memory comprises a basic input/output system memory.

26. The fault notification system described in claim 17, further comprising a basic input/output system that instructs the central processor to load the network message into the transmission system for transport to the monitoring system when the operating system fails to properly boot.

27. The fault notification system described in claim 17, wherein the non-volatile memory is accessible by the transmission system.

28. The fault notification system described in claim 27, wherein the transmission system comprises a network interface card.

29. The fault notification system described in claim 17, further comprising an auxiliary processor that loads the network message into the transmission system.

30. The fault notification system described in claim 29, wherein the auxiliary processor monitors the operation of the central processor.

31. The fault notification system described in claim 29, wherein the auxiliary processor is powered by an auxiliary power supply.

32. The fault notification system described in claim 29, wherein the auxiliary processor monitors an operating temperature of the network device and voltage generated by a power supply.

33. A fault notification process as in claim 17 wherein the network message is constructed based on a computer network protocol.

34. A fault notification system for a network device, comprising:
   an operating system executing on a central processor of the network device that constructs a network message signaling a non-operational state of the operating system;
   a non-volatile memory that holds the network message; and
   a transmission system that accesses the non-volatile memory and sends the network message a predetermined time after detecting power-up of the network device unless instructed otherwise by the operating system.

35. A fault notification system for a network device comprising:
   an operating system executing on a central processor of the network device that constructs a network message signaling a non-operational state of the operating system;
   a non-volatile memory that holds the network message;
   a timing system that is enabled in response to power-up of the network device; and
   a transmission system that accesses the non-volatile memory and loads the network message into a transport buffer in response to power-up and sends the message if the timing system times-out unless disabled by the operating system.

36. A fault notification system comprising:
   an operating system executing on a central processor of the network device that constructs a network message signaling a non-operational state of the operating system;
   a non-volatile memory that holds the network message; and
   a transmission system that accesses the non-volatile memory and sends the network message to a monitoring system in response to the non-operational state of the operating system;
   wherein the central processing unit forms a new network message and the transmission system sends the new message in response to the central processing unit detecting failures during a self-test sequence.

37. A fault notification system for a network device, comprising:
   an operating system executing on a central processor of the network device that constructs a network message signaling a non-operational state of the operating system;
   a non-volatile memory that holds the network message;
   a transmission system that sends the network message to a monitoring system in response to the non-operational state of the operating system; and auxiliary processor that transmits the network message to a transport buffer of the transmission system via a dedicated bus to load the message in the transmission system.

38. The fault notification system described in claim 32, wherein the bus is an integrated interconnect-type bus.

39. A fault notification system for a network device, comprising:
   an operating system executing on a central processor of the network device that constructs a network message signaling a non-operational state of the operating system;
   a non-volatile memory that holds the network message;
   a transmission system that sends the network message to a monitoring system in response to the non-operational state of the operating system; and
   an auxiliary processor that loads the network message into the transmission system, the auxiliary processor triggering the sending of the network message a predetermined time after detecting power-up of the network device unless instructed otherwise by the operating system.

40. A fault notification system for a network device including a central processing unit, peripheral devices, and a main bus connecting the central processing unit to the peripheral devices, the system comprising:

a secondary bus;

an auxiliary processor that detects a fault condition of the device via the secondary bus and constructs a network message declaring the fault condition; and a transmission system that receives the network message in a transport buffer via the secondary bus and sends the message to a monitoring system.

41. The fault notification system described in claim 40, wherein the auxiliary processor monitors the operation of the central processing unit.

42. The fault notification system described in claim 40, wherein the auxiliary processor is powered by an auxiliary power supply.

43. The fault notification system described in claim 40, wherein the auxiliary processor monitors an operating temperature of the network device and voltage generated by a power supply.

44. A fault notification system for a network device including a central processing unit, peripheral devices, and a main bus connecting the central processing unit to the peripheral devices, the system comprising:

an integrated interconnect-type bus in direct communication with the central processing unit;

an auxiliary processor that detects a fault condition of the device via the integrated interconnect-type bus and constructs a network message declaring the fault condition; and a transmission system that sends the network message to a monitoring system.

45. A fault notification system for a network device including a central processing unit, peripheral devices, and a main bus connecting the central processing unit to the peripheral devices, the system comprising:

a secondary bus;

an auxiliary processor that detects a fault condition of the device via the secondary bus and constructs a network message declaring the fault condition; and a transmission system that sends the network message to a monitoring system;

wherein the auxiliary processor sends the network message a predetermined time after detecting power-up of the network device unless instructed otherwise by an operating system executing on the central processing unit.

* * * * *